(12) United States Patent
Ahn et al.

(10) Patent No.: US 8,457,238 B2
(45) Date of Patent: Jun. 4, 2013

(54) METHOD OF SOFT DECISION DECODING AND APPARATUS FOR SOFT DECISION DECODING

(75) Inventors: Seung hyuk Ahn, Suwon-si (KR); Hyung won Kim, Seongnam-si (KR)

(73) Assignee: Xronet Corporation (KR)

( * ) Notice: Subject to any disclaimer, the term of this patent is extended or adjusted under 35 U.S.C. 154(b) by 567 days.

(21) Appl. No.: 12/809,122

(22) PCT Filed: Dec. 19, 2008

(86) PCT No.: PCT/KR2008/007544
§ 371 (c)(1),
(2), (4) Date: Jun. 18, 2010

(87) PCT Pub. No.: WO2009/082135
PCT Pub. Date: Jul. 2, 2009

(65) Prior Publication Data
US 2010/0272200 A1    Oct. 28, 2010

(30) Foreign Application Priority Data
Dec. 24, 2007 (KR) .................. 10-2007-0136157

(51) Int. Cl.
*H04L 1/02* (2006.01)
*H04L 27/06* (2006.01)

(52) U.S. Cl.
USPC .................................. 375/267; 375/341

(58) Field of Classification Search
USPC .......... 375/267, 260, 147, 144, 341; 714/781, 714/792, 794
See application file for complete search history.

(56) References Cited

U.S. PATENT DOCUMENTS

| | | | |
|---|---|---|---|
| 7,720,181 B2 * | 5/2010 | Park et al. | 375/341 |
| 7,822,151 B2 * | 10/2010 | Murakami et al. | 375/341 |
| 2008/0232500 A1 | 9/2008 | Oh et al. | |
| 2009/0110124 A1 | 4/2009 | Fatemi-Ghomi et al. | |

FOREIGN PATENT DOCUMENTS

| | | |
|---|---|---|
| KR | 10-0626654 | 9/2006 |
| KR | 10-2007-0046331 | 5/2007 |
| KR | 10-2007-0099950 | 10/2007 |
| WO | 2006/018605 | 2/2006 |

OTHER PUBLICATIONS

International Search Report—PCT/KR2008/007544 dated Jun. 29, 2009.
Written Opinion—PCT/KR2008/007544 dated Jun. 29, 2009.

* cited by examiner

*Primary Examiner* — Khai Tran
(74) *Attorney, Agent, or Firm* — Cantor Colburn LLP (57) ABSTRACT

A soft decision decoding method in a multiple-input multiple-output system which respectively receives two simultaneously transmitted data streams, a first transmitting symbol and a second transmitting symbol, in a first receiving signal and a second receiving signal is provided. The soft decision decoding method includes calculating common metrics corresponding to distances between first candidate symbols, which correspond to combinations of all bits that the first transmitting symbol can have, and the first receiving signal using a channel matrix corresponding to a communication channel through which the first and second transmitting symbols are transmitted and determining intermediate nodes between the second receiving signal and the first candidate symbols and nodes between the second receiving signal and second candidate symbols corresponding to combinations of all bits that the second transmitting symbol can have; selecting first nearest candidate symbols that are at a shortest distance from the intermediate nodes on a signal constellation from among the second candidate symbols and determining a soft decision metric for each bit value of the first transmitting symbol based on the first nearest candidate symbols and the common metrics; and determining second nearest candidate symbols based on a logic value of a predetermined bit of each of the second candidate symbols and the positions of the intermediate nodes on the signal constellation and determining a soft decision metric for each bit value of the second transmitting symbol using the second nearest candidate symbols and the common metrics.

12 Claims, 8 Drawing Sheets

METHOD OF SOFT DECISION DECODING AND APPARATUS FOR SOFT DECISION DECODING

TECHNICAL FIELD

The present invention relates to a multiple-input multiple-output (MIMO) system, and more particularly, to a soft decision decoding method and apparatus for the MIMO system.

BACKGROUND ART

With the increase of demand on high-speed data communication, studies on a spatial multiplexing scheme for providing a high transmission rate using limited frequency resources have been performed. In the spatial multiplexing scheme, a transmitter simultaneously transmits at least two data streams using a plurality of antennas and a receiver divides and detects data streams received through a plurality of antenna in order to increase a data transmission rate.

Figure 1:
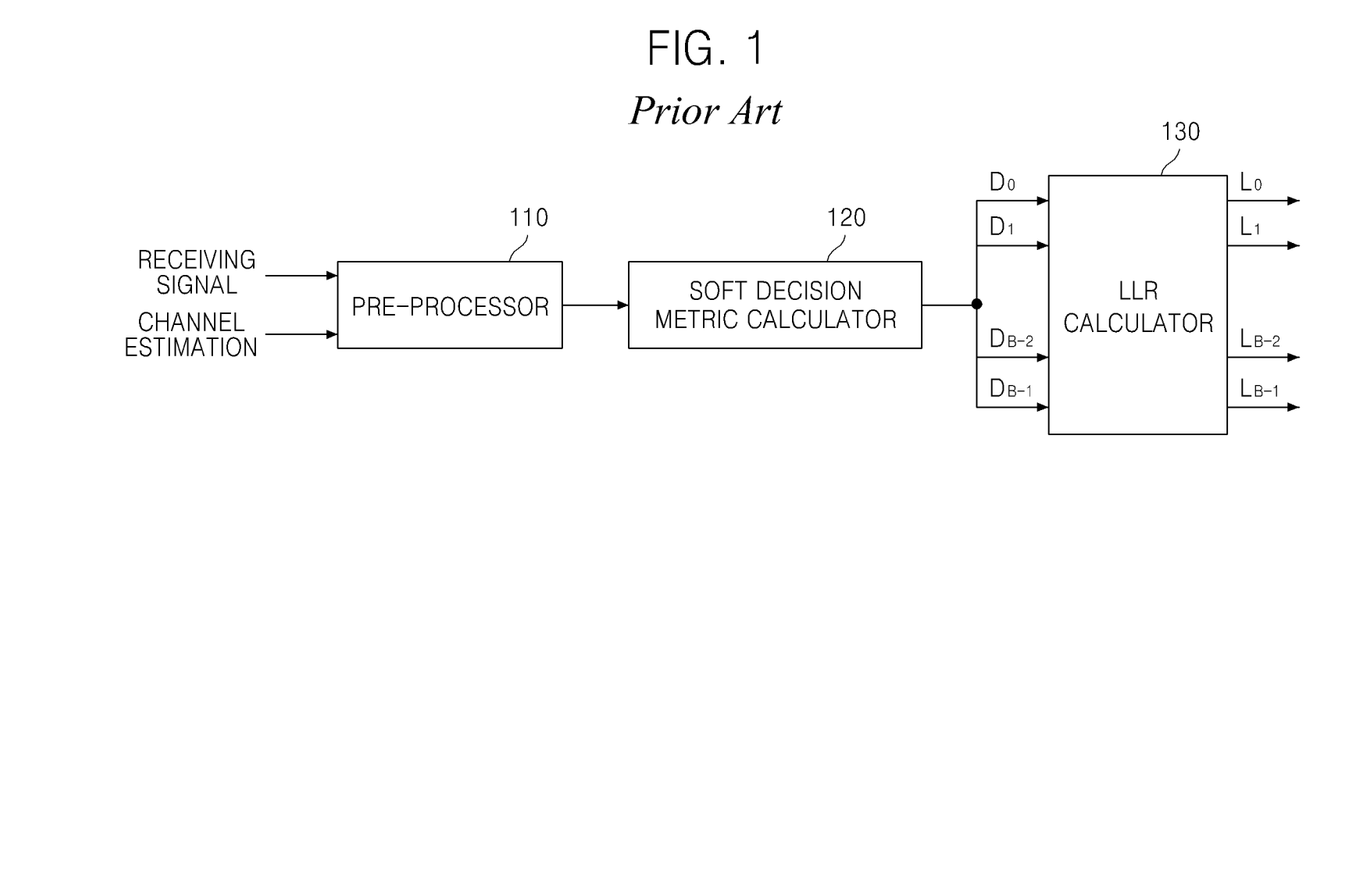
FIG. 1 is a block diagram of a conventional spatial multiplexer.

FIG. 1 is a block diagram of a conventional spatial multiplexer. The conventional spatial multiplexer includes a pre-processor 110, a soft decision metric calculator 120, and a log likelihood ratio (LLR) calculator 130.

The pre-processor 110 receives and pre-processes a receiving signal and a channel estimation value using, for example, QR decomposition to facilitate symbol search. The soft decision metric calculator 120 searches a set of candidates for a transmitting signal using an algorithm such as a maximum likelihood method, spear decoding, or QRm-MLD to find symbols closest to the receiving signal with respect to each bit value of a transmitting symbol (i.e., with respect to a case where a bit of the transmitting symbol is 1 and a case where a bit of the transmitting symbol is 0) and calculates a shortest metric which is a distance between each closest symbol and the receiving signal. The LLR calculator 130 calculates an LLR, i.e., a soft decision value with respect to each bit value of the transmitting symbol using metrics calculated by the soft decision metric calculator 120. Such soft decision values may be used as inputs of a channel decoder. Although many approaches have been suggested for a spatial multiplexer, they usually use the structure illustrated in FIG. 1 and have differences in candidate symbol search in terms of manifestation and performance.

There are many symbol candidate search methods. When maximum likelihood estimation is used, performance is good, but system complexity increases since the amount of calculation exponentially increases as the number of transmitting data streams increases. To search for candidate symbols in the maximum likelihood estimation, metrics for all transmitting candidate symbols are calculated and the least value is selected from the metrics in order to obtain the shortest metric for each bit value of a transmitting symbol. For instance, in case of 64 quadrature amplitude modulation (QAM) 2×2 multiple-input multiple-output system (MIMO), calculations are performed with respect to $2^6\Delta^6=4096$ candidates.

Recently, studies have focused on approximate maximum likelihood estimation providing performance similar to that of the maximum likelihood estimation with less complexity. Although the approximate maximum likelihood estimation is modified in various manners according to specific search methods, usually a candidate set is reduced to a smaller partial candidate set and metric calculation and selection is performed with respect to the partial candidate set. However, there is possibility of omitting essential candidates, which causes performance deterioration. On the other hand, to obtain the performance similar to that of the maximum likelihood estimation, the size of the partial candidate set needs to be increased, which increases the amount of calculation. When candidates are sequentially searched, processing may take long time and it is difficult to use efficient methods such as parallel processing and pipelining.

DISCLOSURE OF INVENTION

Technical Problem

The present invention provides a soft decision decoding method and apparatus for providing performance similar to that of maximum likelihood estimation with low complexity.

Advantageous Effects

According to the present invention, a soft decision decoding method and apparatus provide performance similar to that of maximum likelihood estimation with the less amount of calculation and low complexity.

BEST MODE FOR CARRYING OUT THE INVENTION

According to an aspect of the present invention, there is provided a soft decision decoding method in a multiple-input multiple-output system which respectively receives two simultaneously transmitted data streams, a first transmitting symbol and a second transmitting symbol, in a first receiving signal and a second receiving signal. The soft decision decoding method includes the operations of calculating common metrics corresponding to distances between first candidate symbols, which correspond to combinations of all bits that the first transmitting symbol can have, and the first receiving signal using a channel matrix corresponding to a communication channel through which the first and second transmitting symbols are transmitted and determining intermediate nodes between the second receiving signal and the first candidate symbols and nodes between the second receiving signal and second candidate symbols corresponding to combinations of all bits that the second transmitting symbol can have; selecting first nearest candidate symbols that are at a shortest distance from the intermediate nodes on a signal constellation from among the second candidate symbols and determining a soft decision metric for each bit value of the first transmitting symbol based on the first nearest candidate symbols and the common metrics; and determining second nearest candidate symbols based on a logic value of a predetermined bit of each of the second candidate symbols and the positions of the intermediate nodes on the signal constellation and determining a soft decision metric for each bit value of the second transmitting symbol using the second nearest candidate symbols and the common metrics.

The soft decision decoding method may further include the operation of decomposing the channel matrix into a normal matrix and a triangular matrix and converting the first and second receiving signals and the first candidate symbols based on the normal and triangular matrixes before calculating the common metrics and the intermediate nodes. The channel matrix may be subjected to QR decomposition and decomposed into the normal matrix and the triangular matrix. The common metrics may be calculated by $$|z_1 - r_{11} s^j_1|^2$$

where $z_1$ is an element of a matrix $$z = \begin{pmatrix} z_0 \\ z_1 \end{pmatrix}$$

determined by the converted first and second receiving signals, $r_{11}$ is an element of the triangular matrix $$R = \begin{pmatrix} r_{00} & r_{01} \\ 0 & r_{11} \end{pmatrix},$$

$s^j_1$ is an element of a matrix $$s = \begin{pmatrix} s^i_0 \\ s^j_1 \end{pmatrix}$$

determined based on the first and second candidate symbols, and "i" and "j" are respectively indexes with respect to the first and second symbols.

The intermediate nodes may be determined by $$z_0 - r_{01} s^j_1$$

where $z_0$ is an element of a matrix $$z = \begin{pmatrix} z_0 \\ z_1 \end{pmatrix}$$

determined by the converted first and second receiving signals, $r_{01}$ is an element of the triangular matrix $$R = \begin{pmatrix} r_{00} & r_{01} \\ 0 & r_{11} \end{pmatrix},$$

$s^j_1$ is an element of a matrix $$s = \begin{pmatrix} s^i_0 \\ s^j_1 \end{pmatrix}$$

determined based on the first and second candidate symbols, and "i" and "j" are respectively indexes with respect to the first and second symbols.

The operation of selecting the first nearest candidate symbols and determining the soft decision metric for each bit value of the first transmitting symbol may include selecting the first nearest candidate symbols that are at the shortest distance from the intermediate nodes on the signal constellation from among the second candidate symbols; calculating first shortest metrics by adding the common metrics to metrics corresponding to distances between the first nearest candidate symbols and the intermediate nodes; and selecting the soft decision metric for each bit value of the first transmitting symbol from among the first shortest metrics.

The selecting the first nearest candidate symbols may include dividing the signal constellation into sections more than the number of the first candidate symbols and selecting as a first nearest candidate symbol a first candidate symbol that is located in the same section as each intermediate node.

The selecting the soft decision metric for each bit value of the first transmitting symbol from among the first shortest metrics may include defining a minimum metric among the first shortest metrics as a hard decision metric and defining a first candidate symbol and a second candidate symbol that are used to obtain the hard decision metric as a first hard decision candidate symbol and a second hard decision candidate symbol, respectively; when a logic value of a certain bit of the first transmitting symbol is the same as that of a corresponding bit of the first hard decision candidate symbol, selecting the hard metric as the soft decision metric for the logic value of the certain bit of the first transmitting symbol; and when a logic value of a certain bit of the first transmitting symbol is different from that of a corresponding bit of the first hard decision candidate symbol, selecting metrics connected with second candidate symbols whose bits corresponding to the certain bit have the same logic value as the certain bit of the first transmitting symbol from the first shortest metrics and selecting a minimum of the selected metrics as the soft decision metric for the logic value of the certain bit of the first transmitting symbol.

The operation of selecting the second nearest candidate symbols and determining the soft decision metric for each bit value of the second transmitting symbol may include when a logic value of a certain bit of the second transmitting symbol is the same as that of a corresponding bit of the second hard decision candidate symbol, selecting the hard metric as the soft decision metric for the logic value of the certain bit of the second transmitting symbol; and when a logic value of a certain bit of the second transmitting symbol is different from that of a corresponding bit of the second hard decision candidate symbol, calculating the soft decision metric for the logic value of the certain bit of the second transmitting symbol using the intermediate nodes, the second candidate symbols, and common metrics.

The calculating the soft decision metric for the logic value of the certain bit of the second transmitting symbol may include, when the logic value of the certain bit of the second transmitting symbol is different from that of the corresponding bit of the second hard decision candidate symbol, (a) selecting candidate symbols whose bits corresponding to the certain bit have the same logic value as the certain bit of the second transmitting symbol from the second candidate symbols; (b) determining candidate symbols, which are at a shortest distance from the intermediate nodes on the signal constellation among the selected second candidate symbols, as the second nearest candidate symbols; (c) calculating second shortest metrics by adding the common metrics to metrics corresponding to distances between the second nearest candidate symbols and the intermediate nodes; and (d) repeating (a) through (c) with respect to each of at least two bit values of the second transmitting symbol and selecting the soft decision metric for the logic value of the certain bit of the second transmitting symbol from second shortest metrics calculated through the repetition of (a) through (c).

Information about the second nearest candidate symbols may be stored in a look-up table and the soft decision metric for the logic value of the certain bit of the second transmitting symbol may be calculated using the information.

According to another aspect of the present invention, there is provided a soft decision decoding apparatus including a common metric calculation unit, a first soft decision metric calculation unit, and a second soft decision metric calculation unit. In a multiple-input multiple-output system which respectively receives two simultaneously transmitted data streams, a first transmitting symbol and a second transmitting symbol, in a first receiving signal and a second receiving signal, the common metric calculation unit calculates common metrics corresponding to distances between first candidate symbols, which correspond to combinations of all bits that the first transmitting symbol can have, and the first receiving signal using a channel matrix corresponding to a communication channel through which the first and second transmitting symbols are transmitted and determines intermediate nodes between the second receiving signal and the first candidate symbols and nodes between the second receiving signal and second candidate symbols corresponding to combinations of all bits that the second transmitting symbol can have. The first soft decision metric calculation unit selects first nearest candidate symbols that are at a shortest distance from the intermediate nodes on a signal constellation from among the second candidate symbols and determines a soft decision metric for each bit value of the first transmitting symbol based on the first nearest candidate symbols and the common metrics. The second soft decision metric calculation unit determines second nearest candidate symbols based on a logic value of a predetermined bit of each of the second candidate symbols and the positions of the intermediate nodes on the signal constellation and determines a soft decision metric for each bit value of the second transmitting symbol using the second nearest candidate symbols and the common metrics.

The soft decision decoding apparatus may further include a channel matrix decomposer decomposing the channel matrix into a normal matrix and a triangular matrix and converting the first and second receiving signals and the first candidate symbols based on the normal and triangular matrixes in order to calculate the common metrics and the intermediate nodes.

The first soft decision metric calculation unit may include a first nearest candidate symbol determiner configured to select the first nearest candidate symbols that are at the shortest distance from the intermediate nodes on the signal constellation from among the second candidate symbols; a first shortest metric calculator configured to calculate first shortest metrics by adding the common metrics to metrics corresponding to distances between the first nearest candidate symbols and the intermediate nodes; and a first soft decision metric selector configured to select the soft decision metric for each bit value of the first transmitting symbol from among the first shortest metrics.

The second soft decision metric calculation unit may include a second nearest candidate symbol determiner configured to select candidate symbols whose bits corresponding to a certain bit have the same logic value as the certain bit of the second transmitting symbol from the second candidate symbols and to determine candidate symbols, which are at a shortest distance from the intermediate nodes on the signal constellation among the selected second candidate symbols, as the second nearest candidate symbols; a second shortest metric calculator configured to calculate second shortest metrics by adding the common metrics to metrics corresponding to distances between the second nearest candidate symbols and the intermediate nodes; and a second soft decision metric selector configured to select a soft decision metric for each bit value of the second transmitting symbol from among the second shortest metrics.

The first soft decision metric calculation unit and the second soft decision metric calculation unit may operate in parallel when determining a soft decision metric for each bit value of the first transmitting symbol and determining a soft decision metric for each bit value of the second transmitting symbol.

MODE FOR THE INVENTION

Specific structures and functions will be described to explain embodiments of the present invention. The present invention may be embodied in many different forms and should not be construed as limited to the embodiments set forth herein.

Various modifications may be made in the present invention, so particular embodiments are illustrated in the drawings and will be described in detail. This invention should not be construed as limited to the embodiments. Rather, these embodiments are provided so that this disclosure will be thorough and complete, and will fully convey the scope of the invention to those skilled in the art. In the drawings, like numbers refer to like elements throughout.

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Hereinafter, a soft decision decoding method and apparatus will be described in detail with reference to the attached drawings. Like reference numbers refer to like elements and the redundant description of the like elements will be omitted.

Figure 2:
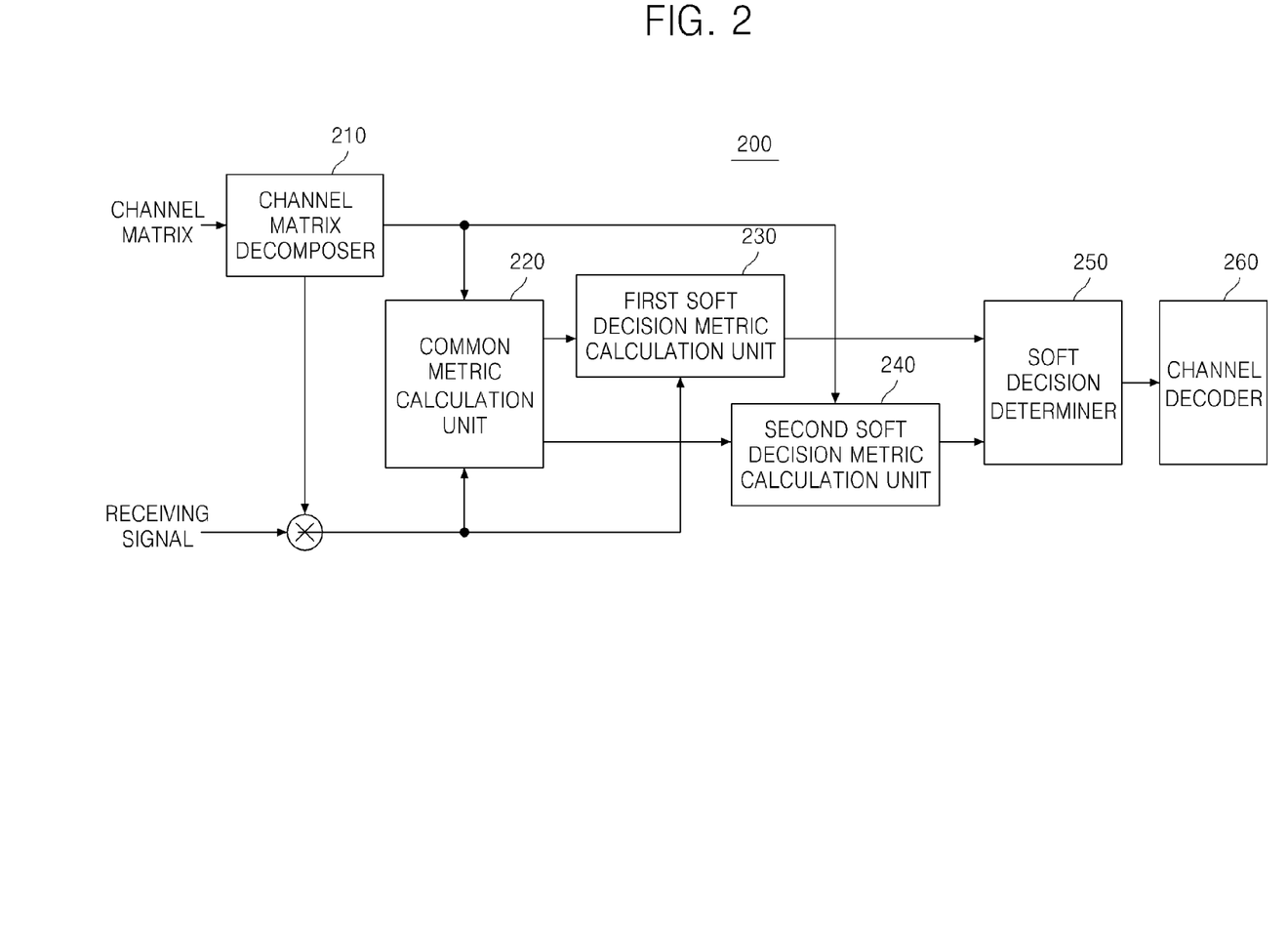
FIG. 2 is a block diagram of a soft decision decoding apparatus according to some embodiments of the present invention.
Figure 3:
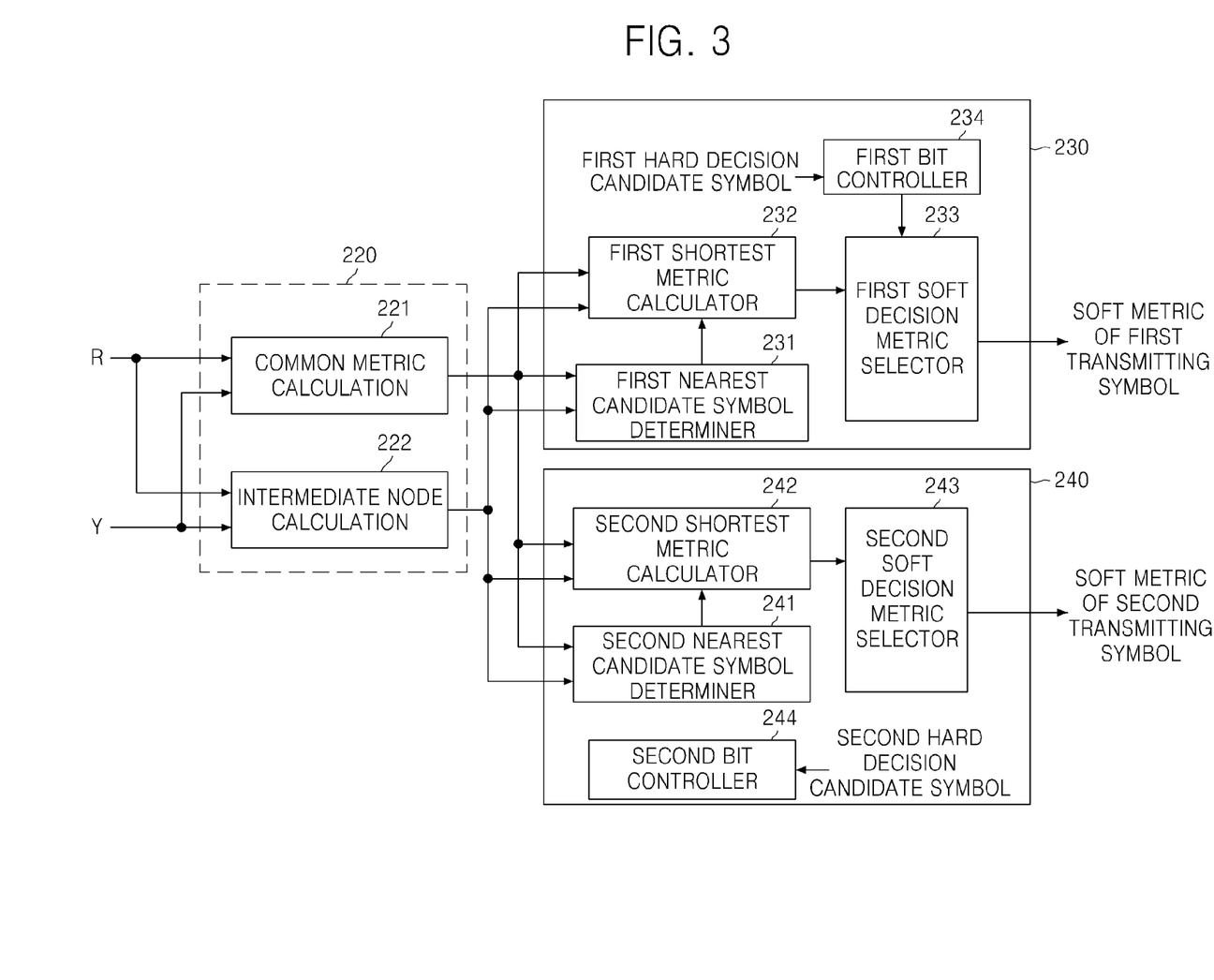
FIG. 3 illustrates the structure of a common metric calculation unit, a first soft decision metric calculation unit, and a second soft decision metric calculation unit illustrated in FIG. 2.

FIG. 2 is a block diagram of a soft decision decoding apparatus 200 according to some embodiments of the present invention. FIG. 3 illustrates the structure of a common metric calculation unit 220, a first soft decision metric calculation unit 230, and a second soft decision metric calculation unit 240 illustrated in FIG. 2. Referring to FIG. 2, the soft decision decoding apparatus 200 includes a channel matrix decomposer 210, the common metric calculation unit 220, the first soft decision metric calculation unit 230, the second soft decision metric calculation unit 240, a soft decision determiner 250, and a channel decoder 260.

The soft decision decoding apparatus 200 receives a first transmitting symbol and a second transmitting symbol, i.e., two data streams simultaneously transmitted as a first receiving signal and a second receiving signal. At this time, the characteristic of a channel through which the first and second transmitting symbols are transmitted may be expressed by a channel matrix. The channel matrix decomposer 210 decomposes the channel matrix into a normal matrix and a triangular matrix and converts the first and second receiving signals and first candidate symbols based on the normal matrix and the triangular matrix. The channel matrix may be decomposed using various methods such as QR decomposition. When the channel matrix is decomposed using the QR decomposition, the first and second receiving signals may be converted using an inverse matrix of a Q matrix.

The common metric calculation unit 220 calculates common metrics and intermediate nodes using the channel matrix. For the calculation, the common metric calculation unit 220 may include a block 221 for calculating the common metrics and a block 222 for calculating the intermediate nodes.

Each common metric may correspond to a distance between the first receiving signal and each of the first candidate symbols. The first candidate symbols are combinations of all bit values that the first transmitting symbol can have and second candidate symbols are combinations of all bit values that the second transmitting symbol can have. For instance, in case of 64 quadrature amplitude modulation (QAM), a single symbol is composed of 6 bits and all possible binary combinations of 6 bits are 64 combinations from "000000" to "111111". Accordingly, when the 64 QAM is used, the number of first candidate symbols is 64 and the number of second candidate symbols is 64. However, the numbers of first candidate symbols and second candidate symbols may change according to embodiments or various communication modes.

In the embodiments of the present invention, a metric may represent similarity between a signal and a symbol. For instance, when a metric is small, the similarity may be high. In addition, a distance among a signal, a node, and a symbol may be represented by a metric and the signal, the node and the symbol may be converted using a channel matrix to calculate the metric.

The intermediate nodes are calculated from the channel matrix and the second receiving signal and may correspond to nodes between the first receiving signal and the second receiving signal and nodes the first candidate symbols and the second candidate symbols. The common metrics and the intermediate nodes calculated by the common metric calculation unit 220 can be used by both of the first and second soft decision metric calculation units 230 and 240, and therefore, the amount of calculation of the soft decision decoding apparatus 200 can be reduced.

The first soft decision metric calculation unit 230 selects from the first candidate symbols first nearest candidate symbols that are at shortest distances from the intermediate nodes on a signal constellation and determines a soft decision metric for each of the bit values of the first transmitting symbol based on the first nearest candidate symbols and the common metrics.

The first soft decision metric calculation unit 230 may include a first nearest candidate symbol determiner 231, a first shortest metric calculator 232, a first soft decision metric selector 233, and a first bit controller 234. The first nearest candidate symbol determiner 231 selects from the first candidate symbols the first nearest candidate symbols that are at shortest distances from the intermediate nodes on the signal constellation. The first shortest metric calculator 232 calculates first shortest metrics by respectively adding the common metrics and metrics respectively corresponding to distances between the respective first nearest candidate symbols and the respective intermediate nodes.

The first soft decision metric selector 233 selects a soft decision metric for each bit value of the first transmitting symbol from the first shortest metrics. The first soft decision metric selector 233 may be controlled by the first bit controller 234 to select the soft decision metric for each bit value of the first transmitting symbol.

The second soft decision metric calculation unit 240 determines second nearest candidate symbols based on a logic value of a predetermined bit of the second candidate symbols and the positions of the intermediate nodes on the signal constellation and determines a soft decision metric for each of the bit values of the second transmitting symbol using the second nearest candidate symbols and the common metrics.

The second soft decision metric calculation unit 240 may include a second nearest candidate symbol determiner 241, a second shortest metric calculator 242, a second soft decision metric selector 243, and a second bit controller 244.

The second nearest candidate symbol determiner 241 selects candidate symbols whose predetermined bit has the same logic value as a corresponding bit of the second transmitting symbol from the second candidate symbols and determines candidate symbols, which are at shortest distances from the intermediate nodes on the signal constellation among the selected candidate symbols, as the second nearest candidate symbols. A procedure of determining the second nearest candidate symbols may be repeated with respect to each of at least one bit of the second transmitting symbol and may be controlled by the second bit controller 244.

The second shortest metric calculator 242 calculates second shortest metrics by respectively adding the common metrics and metrics respectively corresponding to distances between the respective second nearest candidate symbols and the respective intermediate nodes.

The second soft decision metric selector 243 selects a soft decision metric for each bit value of the second transmitting symbol from the second shortest metrics.

The soft decision determiner 250 determines a soft decision value, i.e., a log likelihood ratio (LLR) for each bit value of the first and second transmitting symbols based on the soft decision metrics determined by the first and second soft decision metric calculation units 230 and 240. The channel decoder 260 decides the first and second transmitting symbols based on soft decision values.

Figure 4:
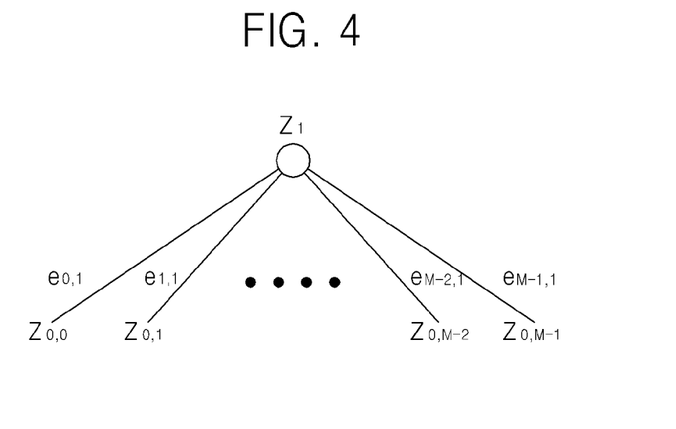
FIG. 4 is a tree diagram of common metrics and intermediate nodes.

FIG. 4 is a tree diagram of common metrics and intermediate nodes. The procedure of calculating the common metrics and the intermediate nodes will be described in detail with reference to FIGS. 3 and 4 and following Equations. Generally, the characteristic of a channel through which a plurality of data streams are transmitted may be expressed by a channel matrix H. At this time, a receiving signal matrix y is a signal given by adding a noise n to the product of a transmitting signal matrix s and the channel matrix H and may be expressed by Equation (1):

$$y = Hs + n \quad (1)$$

The soft decision decoding method according to some embodiments of the present invention is used for a case where two data streams are transmitted simultaneously. At this time, the 2×2 channel matrix H may be expressed by Equation (2):

$$H = \begin{bmatrix} h_{00} & h_{01} \\ h_{10} & h_{11} \end{bmatrix} \quad (2)$$

where the values of $h_{00}$~$h_{11}$ may be a channel coefficient having a complex number.

The channel matrix H by the channel may be decomposed into the product of a normal matrix Q and a triangular matrix R as is expressed by Equation (3):

$$H = QR \quad (3)$$

Equation (1) can be rewritten as Equation (4) using the decomposed matrixes:

$$z = \begin{bmatrix} z_0 \\ z_1 \end{bmatrix} = Rs + n = \begin{bmatrix} r_{00} & r_{01} \\ 0 & r_{11} \end{bmatrix} \begin{bmatrix} s_0 \\ s_1 \end{bmatrix} + \begin{bmatrix} n_0 \\ n_1 \end{bmatrix} \quad (4)$$

where $z_0$ and $z_1$ respectively denote the first and second receiving signals converted by the decomposed matrixes Q and R and $s_0$ and $s_1$ respectively denote the first and second transmitting symbol. Metrics indicating distances between the first and second receiving signals and transmitting candidate symbols may be expressed by Equation (5):

$$e_{ij} = \|y - H \cdot s^{ij}\|^2 \quad (5)$$
$$= \|z - R \cdot s^{ij}\|^2$$
$$= |z_0 - (r_{00}s_0^i + r_{01}s_1^j)|^2 + |z_1 - r_{11}s_1^j|^2$$
$$= e_{ij,0} + e_{j,1}$$

where j is an index of each first candidate symbol $s_1$ and i is an index of each second candidate symbol $s_0$. In usual maximum likelihood estimation, calculation of Equation (5) is performed with respect to all of the indexes j and i and minimum metrics for respective bit values of a transmitting symbol are selected from the calculation results, and therefore, a lot of calculation is required. However, according to some embodiments of the present invention, calculation with respect to the first candidate symbols is separated from calculation with respect to the second candidate symbols and metrics used in common are reused, and therefore, similar performance to the maximum likelihood estimation can be accomplished with less amount of calculation and less system complexity.

In Equation (5), the common metrics may be represented by $e_{j,1}$, which correspond to distances between the first receiving signal z and the first candidate symbols $s_1^j$. In calculating a distance between a signal and a symbol, the 2-norm is used in Equation (5), but the 1-norm or the infinite-norm may be used in other embodiments of the present invention. Referring to FIG. 4, the common metrics correspond to edges $e_{0,1}$ through $e_{M-1,1}$ between the first receiving signal $z_1$ and intermediate nodes z through $z_{0,M-1}$. The intermediate nodes $z_{0,0}$ through $z_{0,M-1}$ may be determined by Equation (6):

$$z_0 - r_{01} s_1^j \quad (6)$$

When the intermediate nodes $z_{0,0}$ through $z_{0,M-1}$ are calculated with respect to the index "j" of the first candidate symbols $s_1^j$ using Equation (6), the coordinates, i.e., the positions of the intermediate nodes $z_{0,0}$ through $z_{0,M-1}$ on the signal constellation can be determined in FIG. 4.

Figure 5:
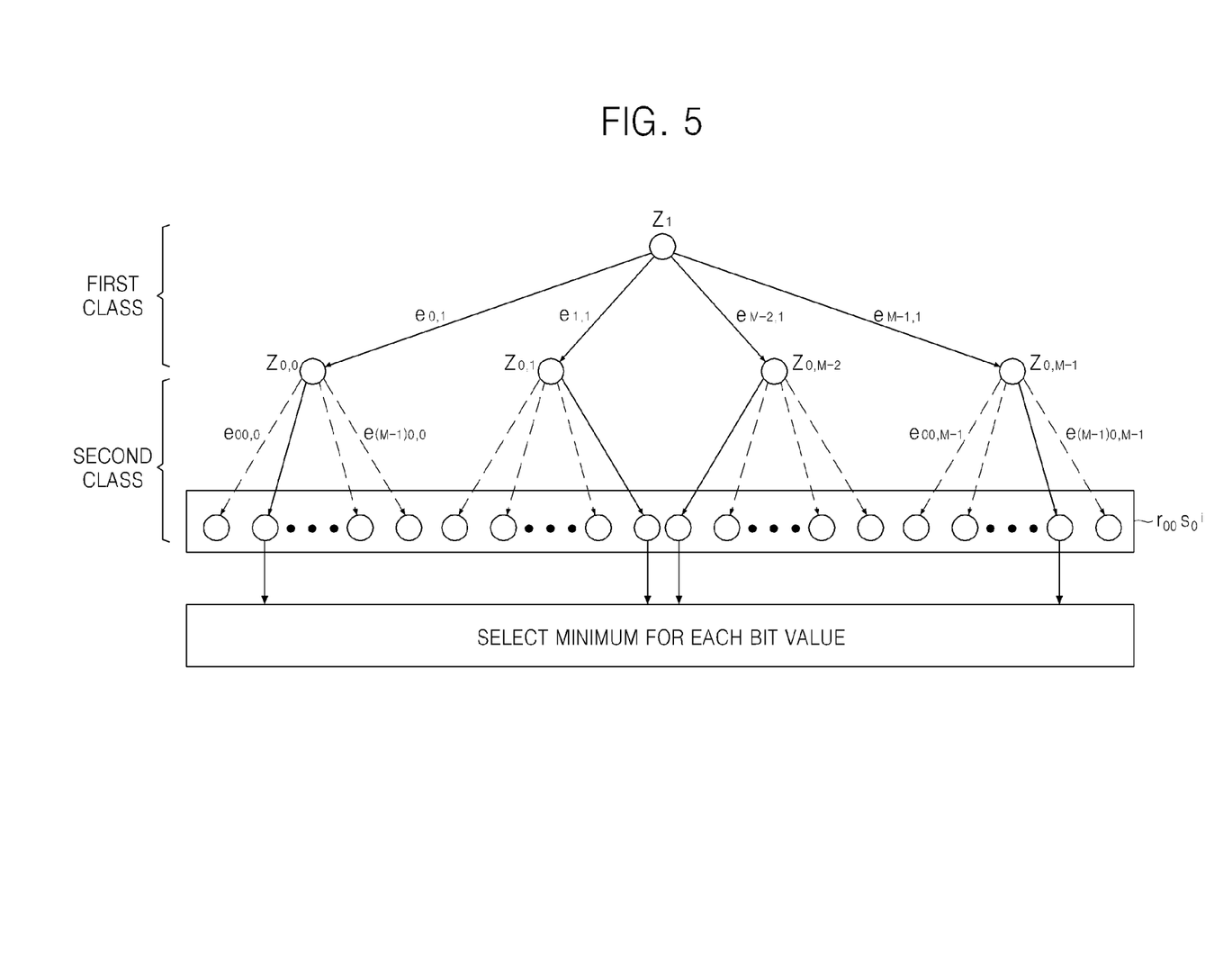
FIG. 5 is a tree diagram illustrating a procedure of determining a soft decision metric for each bit value of a first transmitting symbol.

FIG. 5 is a tree diagram illustrating a procedure of determining a soft decision metric for each bit value of a first transmitting symbol. The procedure of determining the soft decision metric for each bit value of the first transmitting symbol will be described in detail with reference to FIGS. 3 and 5.

Referring to FIG. 5, metrics represented by edges on the tree diagram may be divided into a first class and a second class on the basis of the intermediate nodes $z_{0,0}$ through $z_{0,M-1}$ determined by the common metric calculation unit 220 and metrics $e_{0,1}$ through $e_{M-1,1}$ in the first class are the same as the common metrics $e_{0,1}$ through $e_{M-1,1}$ illustrated in FIG. 4.

The common metric calculation unit 220 determines the intermediate nodes $z_{0,0}$ through $z_{0,M-1}$ and the first soft decision metric calculation unit 230 calculates second-class metrics $e_{00,0}$ through $e_{(M-1)0,M-1}$, which correspond to distances between the intermediate nodes $z_{0,0}$ through $z_{0,M-1}$ and second candidate symbols $r_{00}s_0^i$. At this time, the second candidate symbols $r_{00}s_0^i$ may have been through the conversion using the channel matrix.

For soft decision decoding, metrics are obtained by adding the common metrics $e_{0,1}$ through $e_{M-1,1}$ and the second-class metrics $e_{00,0}$ through $e_{(M-1)0,M-1}$ and minimum values are selected from the obtained metrics for the respective bit values of the first transmitting symbol. In the embodiments of the present invention, the minimum values can be directly selected from the second-class metrics $e_{00,0}$ through $e_{(M-1)0,M-1}$ on the signal constellation, and therefore, repetition of metric calculation and comparison operation can be reduced. In detail, first nearest candidate symbols that are at shortest distances from the intermediate nodes z through z on the signal constellation are selected from the second candidate symbols $r_{00}s_0$ and first shortest candidate metrics are determined by adding the common metrics $e_{0,1}$ through $e_{M-1,1}$ to second-class metrics corresponding to distances between the intermediate nodes $z_{0,0}$ through $z_{0,M-1}$ and the first nearest candidate symbols.

Referring to FIG. 5, among the second-class metrics $e_{00,0}$ through $e_{(M-1)0,0}$, edges represented by solid lines have been through metric calculation. Second candidate symbols connected with these solid-line edges are the first nearest candidate symbols. Edges represented by dotted lines do not substantially need the metric calculation.

Figure 6:
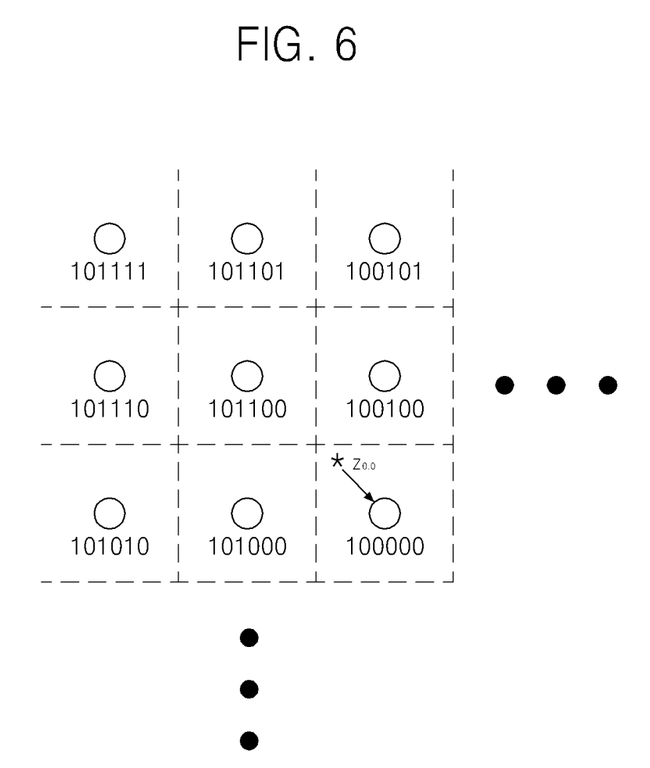
FIG. 6 is a signal constellation diagram illustrating a procedure of determining a first nearest candidate symbol.

FIG. 6 is a signal constellation diagram illustrating a procedure of determining a first nearest candidate symbol, and more particularly, is a part of the signal constellation when 64 QAM is used in some embodiments of the present invention.

On the signal constellation illustrated in FIG. 6, a circle "O" denotes a position of each second candidate symbol and a star "*" denotes an intermediate node, e.g., $z_{0,0}$. In the current embodiments of the present invention, the signal constellation may be divided into sections more than the number of second candidate symbols and a second candidate symbol "100000" located in the same section as the intermediate node $z_{0,0}$ may be selected as the first nearest candidate symbol. Since the selected first nearest candidate symbol "100000" is at the shortest distance from the intermediate node $z_{0,0}$, a metric between the intermediate node $z_{0,0}$ and the first nearest candidate symbol "100000" is a minimum among metrics between the intermediate node $z_{0,0}$ and the second candidate symbols. Accordingly, a minimum metric can be obtained without calculating metrics between all of the second candidate symbols and the intermediate node $z_{0,0}$ and comparing them with one another, so that the amount of calculation can be reduced.

After second-class metrics are calculated, they are added to common metrics to obtain first shortest metrics. Generally, the first shortest metrics are fewer than the number of intermediate nodes. A soft decision metric for each bit value of a first transmitting symbol is selected from the first shortest metrics.

At this time, a metric having a minimum value among the first shortest metrics is defined as a hard decision metric. A first candidate symbol and a second candidate symbol which are used to obtain the hard decision metric are respectively defined as a first hard decision candidate symbol and a second hard decision candidate symbol.

When a soft decision metric for each bit value of the first transmitting symbol is determined, if a logic value of a certain bit of the first transmitting symbol is the same as that of a corresponding bit of the first hard decision candidate symbol, the hard decision metric is determined as the soft decision metric for the logic value of the certain bit of the first transmitting symbol.

For instance, when the first hard decision candidate symbol is "101100" and a logic value of a certain bit of the first transmitting symbol is the same as that of a corresponding bit of the first hard decision candidate symbol, that is, when the first bit of the first transmitting symbol is "1", the second bit thereof is "0", the third bit thereof is "1", the fourth bit thereof is "1", the fifth bit thereof is "0", and the sixth bit thereof is "0", the hard decision metric is selected as the soft decision metric for the logic value of the certain bit.

When a logic value of a certain bit of the first transmitting symbol is different from that of a corresponding bit of the first hard decision candidate symbol, one of first shortest metrics is determined as the soft decision metric for the logic value of the certain bit of the first transmitting symbol.

For instance, when the first hard decision candidate symbol is "101100" and a logic value of each bit of the first transmitting symbol is different from that of a corresponding bit of the first hard decision candidate symbol, that is, when the first bit of the first transmitting symbol is "0", the second bit thereof is "1", the third bit thereof is "0", the fourth bit thereof is "0", the fifth bit thereof is "1", and the sixth bit thereof is "1", one of the first shortest metrics is selected as the soft decision metric for the logic value of the certain bit. For the first bit "0" of the first transmitting symbol, metrics connected with second candidate symbols that have "0" as their first bits are selected from the first shortest metrics and a minimum of the selected metrics is selected as a soft decision metric.

Figure 7:
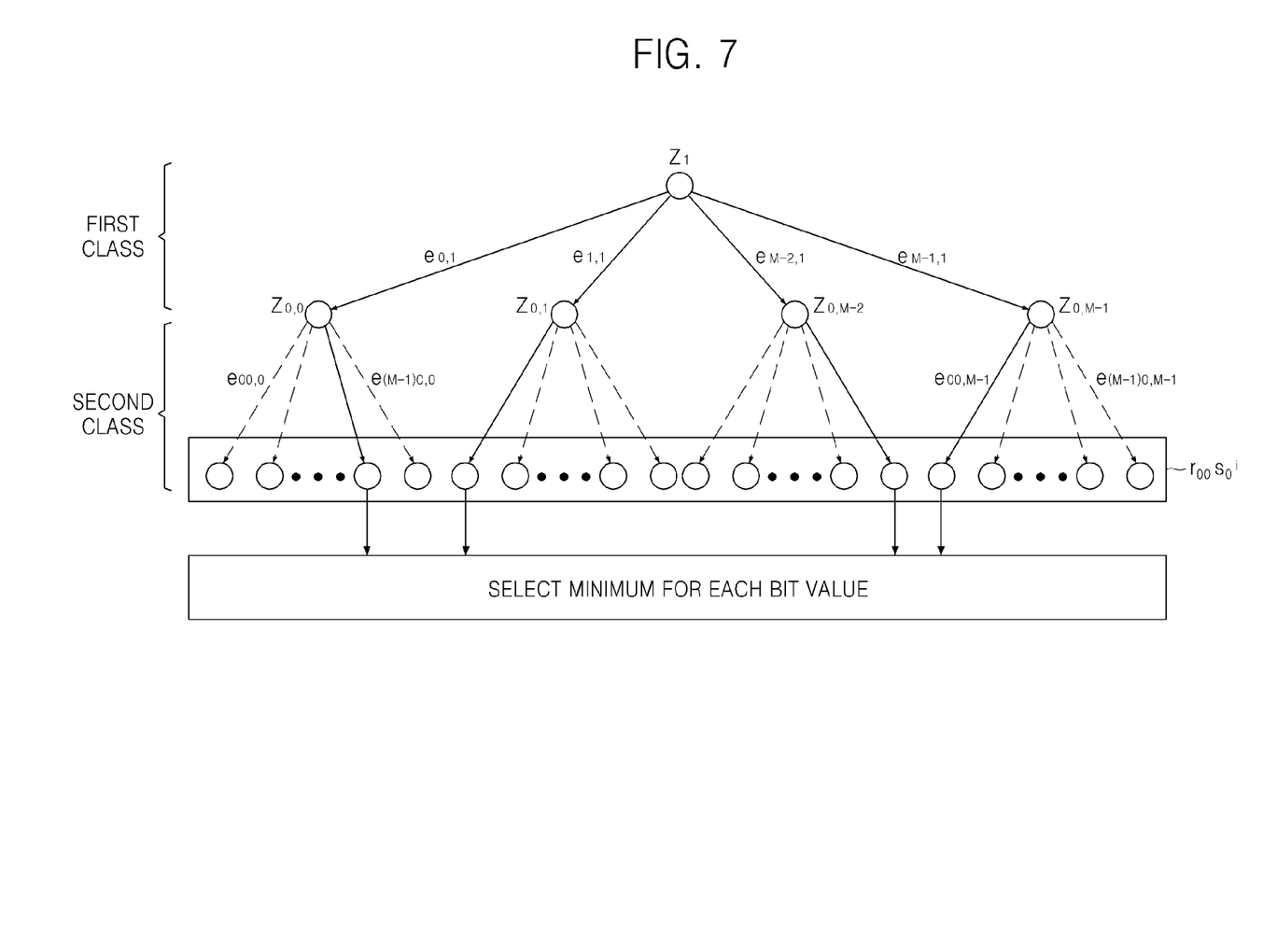
FIG. 7 is a tree diagram illustrating a procedure of determining a soft decision metric for each bit value of a second transmitting symbol.

FIG. 7 is a tree diagram illustrating a procedure of determining a soft decision metric for each bit value of a second transmitting symbol. The procedure of determining the soft decision metric for each bit value of the second transmitting symbol will be described in detail with reference to FIGS. 3 and 7.

Referring to FIG. 7, metrics represented by edges on the tree diagram may be divided into a first class and a second class on the basis of the intermediate nodes $z_{0,0}$ through $z_{0,M-1}$ and metrics $e_{0,1}$ through $e_{M-1,1}$ in the first class are the same as the common metrics $e_{0,1}$ through $e_{M-1,1}$ illustrated in FIG. 4.

The common metric calculation unit 220 determines the intermediate nodes $z_{0,0}$ through $z_{0,M-1}$ and the second soft decision metric calculation unit 240 calculates second-class metrics $e_{00,0}$ through $e_{(M-1)0,M-1}$, which correspond to distances between the intermediate nodes $z_{0,0}$ through $z_{0,M-1}$ and second candidate symbols $r_{00}s_0{}^i$. At this time, the second candidate symbols $r_{00}s_0$ may have been through the conversion using the channel matrix.

For soft decision decoding, metrics are obtained by adding the common metrics $e_{0,1}$ through $e_{M-1,1}$ and the second-class metrics $e_{00,0}$ through $e_{(M-1)0,M-1}$ and minimum values are selected from the obtained metrics for the respective bit values of the second transmitting symbol. In the embodiments of the present invention, the minimum values can be directly selected from the second-class metrics $e_{00,0}$ through $e_{(M-1)0,M-1}$ on the signal constellation, and therefore, repetition of metric calculation and comparison operation can be reduced. In detail, second nearest candidate symbols that are at shortest distances from the intermediate nodes $z_{0,0}$ through $z_{0,M-1}$ on the signal constellation are selected from the second candidate symbols $r_{00}s_0$ and second shortest metrics are determined by adding the common metrics $e_{0,1}$ through $e_{M-1,1}$ to second-class metrics corresponding to distances between the intermediate nodes $z_{0,0}$ through $z_{0,M-1}$ and the second nearest candidate symbols.

Referring to FIG. 7, among the second-class metrics $e_{00,0}$ through $e_{(M-1)0,M-1}$, edges represented by solid lines have been through metric calculation. Second candidate symbols connected with these solid-line edges are the second nearest candidate symbols. Edges represented by dotted lines do not substantially need the metric calculation.

In order to determine a soft decision metric for each bit value of the second transmitting symbol, a minimum metric for each bit value needs to be determined with respect to every second candidate symbol, and therefore, metric calculation is repeated for each bit value of the second transmitting symbol. Accordingly, the number of second shortest metrics obtained through repeated calculation may be greater than the number of first shortest metrics.

When a logic value of a certain bit of the second transmitting symbol is the same as that of a corresponding bit of the second hard decision candidate symbol, the hard decision metric may be determined as the soft decision metric for the logic value of the certain bit of the second transmitting symbol. When a logic value of a certain bit of the second transmitting symbol is different from that of a corresponding bit of the second hard decision candidate symbol, soft decision metrics for the logic value of the certain bit of the second transmitting symbol may be selected from the second shortest metrics.

Figure 8:
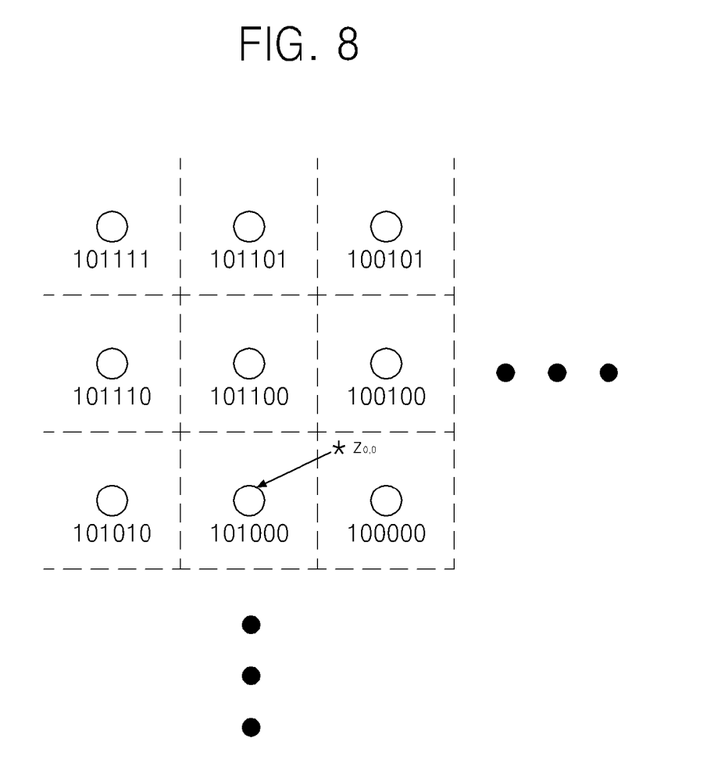
FIG. 8 is a signal constellation diagram illustrating a procedure of determining a second nearest candidate symbol.

FIG. 8 is a signal constellation diagram illustrating a procedure of deciding a second nearest candidate symbol, and more particularly, is a part of the signal constellation when 64 QAM is used in some embodiments of the present invention. On the signal constellation illustrated in FIG. 8, a circle "0" denotes a position of each second candidate symbol and a star "*" denotes an intermediate node, e.g., $z_{0,0}$. According to the embodiments of the present invention, among second candidate symbols having a predetermined bit value, one closest to the intermediate node $z_{0,0}$ can be directly detected using the coordinates of the intermediate node $z_{0,0}$ on the signal constellation.

For instance, when a soft decision metric for the third bit of "1" of the second transmitting symbol is determined, among second candidate symbols that have the same value "1" as the second transmitting symbol as their third bits, a candidate symbol "101000" at the shortest distance from the intermediate node $z_{0,0}$ is determined as a second nearest candidate symbol. Information about the second nearest candidate symbol may be stored in a look-up table and used to calculate the soft decision metric.

As described above, in order to determine a minimum metric considering all of the second candidate symbols when soft decision metrics are determined for the second transmitting symbol, a procedure of determining second nearest candidate symbols and determining second shortest metrics by adding common metrics to metrics corresponding to distances between the second nearest candidate symbols and intermediate nodes is repeated with respect to each bit value of the second transmitting symbol. At this time, since the hard decision metric can be used when a logic value of a certain bit of the second transmitting symbol is the same as that of a corresponding bit of the second hard decision candidate symbol, the procedure of determining the second nearest candidate symbols and the second shortest metrics is repeated only when the logic value of a bit of the second transmitting symbol is different from that of a corresponding bit of the second hard decision candidate symbol.

For instance, when the second hard decision candidate symbol is "010011" and when the first bit of the second transmitting symbol is "0", the second bit thereof is "1", the third bit thereof is "0", the fourth bit thereof is "0", the fifth bit thereof is "1", and the sixth bit thereof is "1", the hard decision metric is selected as the soft decision metric for each bit value of the second transmitting symbol.

When the second hard decision candidate symbol is "010011" and when the first bit of the second transmitting symbol is "1", the second bit thereof is "0", the third bit thereof is "1", the fourth bit thereof is "1", the fifth bit thereof is "0", and the sixth bit thereof is "0", the soft decision metrics for the second transmitting symbol are selected from second shortest metrics obtained by repeating the procedure of determining second nearest candidate symbols and second shortest metrics with respect to each bit of the second transmitting symbol.

Some of first shortest metrics calculated in a procedure of determining a soft decision metric for each bit value of the first transmitting symbol can be used when a soft decision metric for each bit value of the second transmitting symbol is determined, so that the substantial amount of calculation can be more reduced.

A soft decision decoding method according to some embodiments of the present invention can be used for a case where an arbitrary number of transceiving antennas are used only if the number of data streams simultaneously transmitted is two. The soft decision decoding method may be embodied in hardware or software. In the above-described embodiments of the present invention, intermediate calculation results are reused to reduce the amount of entire calculation, but calculation may be re-performed each time in other embodiments of the present invention.

As described above, according to some embodiments of the present invention, metrics used in common with respect to symbols transmitted simultaneously are reused and minimum metrics are easily determined based on positions of intermediate nodes on a signal constellation, so that performance similar to that of maximum likelihood estimation can be accomplished and the amount of calculation and system complexity can be reduced. In addition, since parallel processing is possible regarding similar calculations by symbols/bits, efficient methods such as a parallel structure, pipelining, and reuse of same blocks can be easily adapted to hardware.

INDUSTRIAL APPLICABILITY

The present invention can be used for a soft decision decoding method and apparatus.

The invention claimed is:

1. A soft decision decoding method in a multiple-input multiple-output system which respectively receives two simultaneously transmitted data streams, a first transmitting symbol and a second transmitting symbol, in a first receiving signal and a second receiving signal, the soft decision decoding method comprising:
    calculating common metrics corresponding to distances between first candidate symbols, which correspond to combinations of all bits that the first transmitting symbol can have, and the first receiving signal using a channel matrix corresponding to a communication channel through which the first and second transmitting symbols are transmitted and determining intermediate nodes between the second receiving signal and the first candidate symbols and nodes between the second receiving signal and second candidate symbols corresponding to combinations of all bits that the second transmitting symbol can have;
    selecting first nearest candidate symbols that are at a shortest distance from the intermediate nodes on a signal constellation from among the second candidate symbols and determining a soft decision metric for each bit value of the first transmitting symbol based on the first nearest candidate symbols and the common metrics; and
    determining second nearest candidate symbols based on a logic value of a pre-determined bit of each of the second candidate symbols and the positions of the intermediate nodes on the signal constellation and determining a soft decision metric for each bit value of the second transmitting symbol using the second nearest candidate symbols and the common metrics.

2. The soft decision decoding method of claim 1, further comprising the operation of decomposing the channel matrix into a normal matrix and a triangular matrix and converting the first and second receiving signals and the first candidate symbols based on the normal and triangular matrixes before calculating the common metrics and the intermediate nodes.

3. The soft decision decoding method of claim 2, wherein the channel matrix is subjected to QR decomposition and is decomposed into the normal matrix and the triangular matrix.

4. The soft decision decoding method of claim 2, wherein the common metrics are calculated by $$|z_1 - r_{11} s^j_1|^2$$

where $z_1$ is an element of a matrix $$z = \begin{pmatrix} z_0 \\ z_1 \end{pmatrix}$$

determined by the converted first and second receiving signals, $r_{11}$ is an element of the triangular matrix $$R = \begin{pmatrix} r_{00} & r_{01} \\ 0 & r_{11} \end{pmatrix},$$

$s_1^j$ is an element of a matrix $$s = \begin{pmatrix} s_0^i \\ s_1^j \end{pmatrix}$$

determined based on the first and second candidate symbols, and "i" and "j" are respectively indexes with respect to the first and second symbols.

5. The soft decision decoding method of claim 2, wherein the intermediate nodes are determined by $$z_0 - r_{01} s_1^j$$

where $z_0$ is an element of a matrix $$z = \begin{pmatrix} z_0 \\ z_1 \end{pmatrix}$$

determined by the converted first and second receiving signals, $r_{01}$ is an element of the triangular matrix $$R = \begin{pmatrix} r_{00} & r_{01} \\ 0 & r_{11} \end{pmatrix},$$

$s_1^j$ is an element of a matrix $$s = \begin{pmatrix} s_0^i \\ s_1^j \end{pmatrix}$$

determined based on the first and second candidate symbols, and "i" and "j" are respectively indexes with respect to the first and second symbols.

6. The soft decision decoding method of claim 1, wherein the operation of selecting the first nearest candidate symbols and determining the soft decision metric for each bit value of the first transmitting symbol comprises:
    selecting the first nearest candidate symbols that are at the shortest distance from the intermediate nodes on the signal constellation from among the second candidate symbols;
    calculating first shortest metrics by adding the common metrics to metrics corresponding to distances between the first nearest candidate symbols and the intermediate nodes; and
    selecting the soft decision metric for each bit value of the first transmitting symbol from among the first shortest metrics.

7. The soft decision decoding method of claim 6, wherein the selecting the first nearest candidate symbols comprises dividing the signal constellation into sections more than the number of the first candidate symbols and selecting as a first nearest candidate symbol a first candidate symbol that is located in the same section as each intermediate node.

8. The soft decision decoding method of claim 6, wherein the selecting the soft decision metric for each bit value of the first transmitting symbol from among the first shortest metrics comprises:
    defining a minimum metric among the first shortest metrics as a hard decision metric and defining a first candidate symbol and a second candidate symbol that are used to obtain the hard decision metric as a first hard decision candidate symbol and a second hard decision candidate symbol, respectively;
    when a logic value of a certain bit of the first transmitting symbol is the same as that of a corresponding bit of the first hard decision candidate symbol, selecting the hard metric as the soft decision metric for the logic value of the certain bit of the first transmitting symbol; and
    when a logic value of a certain bit of the first transmitting symbol is different from that of a corresponding bit of the first hard decision candidate symbol, selecting metrics connected with second candidate symbols whose bits corresponding to the certain bit have the same logic value as the certain bit of the first transmitting symbol from the first shortest metrics and selecting a minimum of the selected metrics as the soft decision metric for the logic value of the certain bit of the first transmitting symbol.

9. The soft decision decoding method of claim 8, wherein the operation of selecting the second nearest candidate symbols and determining the soft decision metric for each bit value of the second transmitting symbol comprises:
    when a logic value of a certain bit of the second transmitting symbol is the same as that of a corresponding bit of the second hard decision candidate symbol, selecting the hard metric as the soft decision metric for the logic value of the certain bit of the second transmitting symbol; and
    when a logic value of a certain bit of the second transmitting symbol is different from that of a corresponding bit of the second hard decision candidate symbol, calculating the soft decision metric for the logic value of the certain bit of the second transmitting symbol using the intermediate nodes, the second candidate symbols, and common metrics.

10. The soft decision decoding method of claim 9, wherein the calculating the soft decision metric for the logic value of the certain bit of the second transmitting symbol comprises, when the logic value of the certain bit of the second transmitting symbol is different from that of the corresponding bit of the second hard decision candidate symbol:
    (a) selecting candidate symbols whose bits corresponding to the certain bit have the same logic value as the certain bit of the second transmitting symbol from the second candidate symbols;
    (b) determining candidate symbols, which are at a shortest distance from the intermediate nodes on the signal constellation among the selected second candidate symbols, as the second nearest candidate symbols;
    (c) calculating second shortest metrics by adding the common metrics to metrics corresponding to distances between the second nearest candidate symbols and the intermediate nodes; and
    (d) repeating (a) through (c) with respect to each of at least two bit values of the second transmitting symbol and selecting the soft decision metric for the logic value of the certain bit of the second transmitting symbol from second shortest metrics calculated through the repetition of (a) through (c).

11. The soft decision decoding method of claim 10, wherein information about the second nearest candidate symbols is stored in a look-up table and the soft decision metric for the logic value of the certain bit of the second transmitting symbol is calculated using the information.

12. A soft decision decoding apparatus in a multiple-input multiple-output system which respectively receives two simultaneously transmitted data streams, a first transmitting symbol and a second transmitting symbol, in a first receiving signal and a second receiving signal, the soft decision decoding apparatus comprising:

a common metric calculation unit configured to calculate common metrics corresponding to distances between first candidate symbols, which correspond to combinations of all bits that the first transmitting symbol can have, and the first receiving signal using a channel matrix corresponding to a communication channel through which the first and second transmitting symbols are transmitted and to determine intermediate nodes between the second receiving signal and the first candidate symbols and nodes between the second receiving signal and second candidate symbols corresponding to combinations of all bits that the second transmitting symbol can have;

a first soft decision metric calculation unit configured to select first nearest candidate symbols that are at a shortest distance from the intermediate nodes on a signal constellation from among the second candidate symbols and to determine a soft decision metric for each bit value of the first transmitting symbol based on the first nearest candidate symbols and the common metrics; and a second soft decision metric calculation unit configured to determine second nearest candidate symbols based on a logic value of a predetermined bit of each of the second candidate symbols and the positions of the intermediate nodes on the signal constellation and to determine a soft decision metric for each bit value of the second transmitting symbol using the second nearest candidate symbols and the common metrics.

\* \* \* \* \*